June 18, 1963 G. W. CONOVER ETAL 3,094,190
INTERNAL COMBUSTION ENGINE
Filed June 8, 1960 9 Sheets-Sheet 3

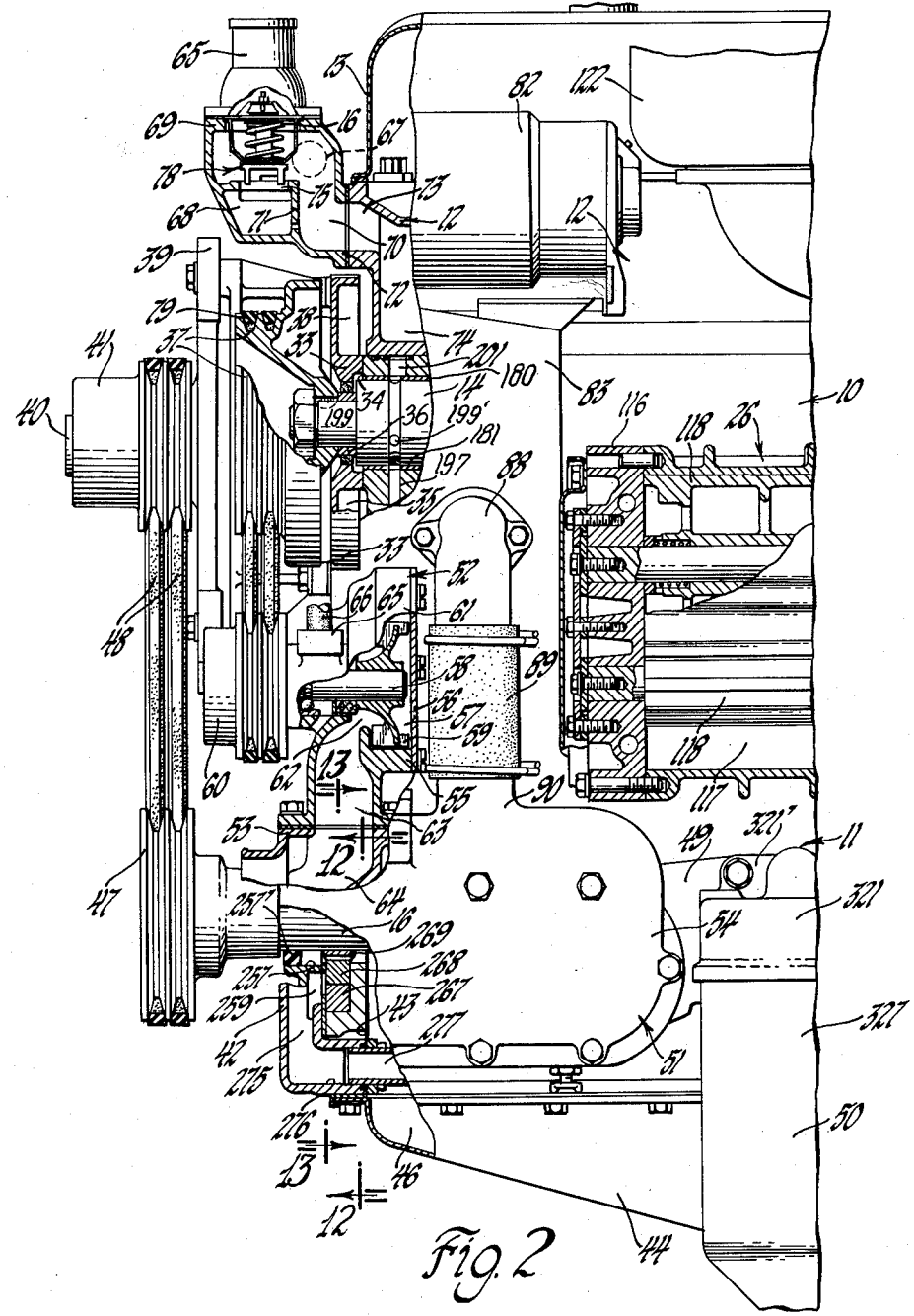

INVENTORS
George W. Conover,
BY Kenneth L. Kulsing &
Joseph Koehler

E. E. James
ATTORNEY

June 18, 1963  G. W. CONOVER ETAL  3,094,190
INTERNAL COMBUSTION ENGINE
Filed June 8, 1960  9 Sheets-Sheet 5

INVENTORS
George W. Conover,
BY Kenneth L. Hulsing &
Joseph Koehler
C. C. James
ATTORNEY INVENTORS
George W. Conover,
BY Kenneth L. Hulsing &
Joseph Koehler
ATTORNEY INVENTORS
George W. Conover,
BY Kenneth L. Hulsing &
Joseph Koehler
E. E. James
ATTORNEY June 18, 1963 G. W. CONOVER ETAL 3,094,190
INTERNAL COMBUSTION ENGINE
Filed June 8, 1960 9 Sheets-Sheet 8

INVENTORS
George W. Conover,
BY Kenneth L. Hulsing &
Joseph Koehler
E. E. James
ATTORNEY

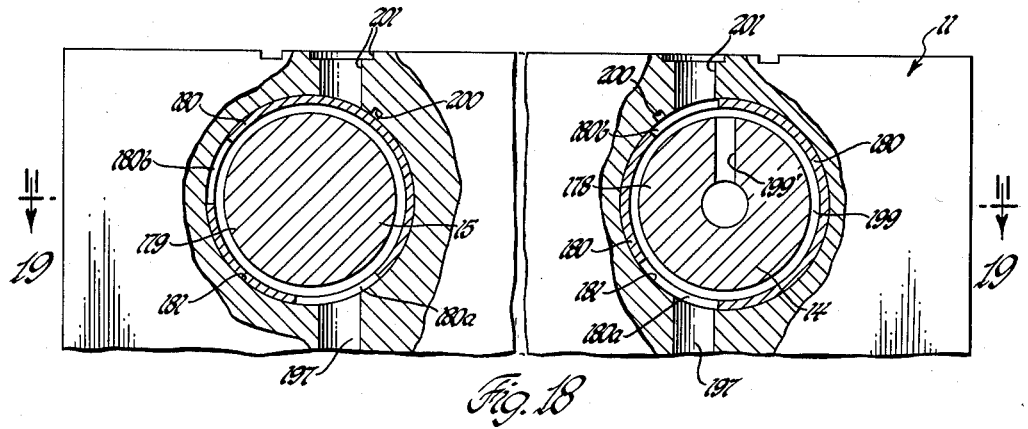
Fig. 18
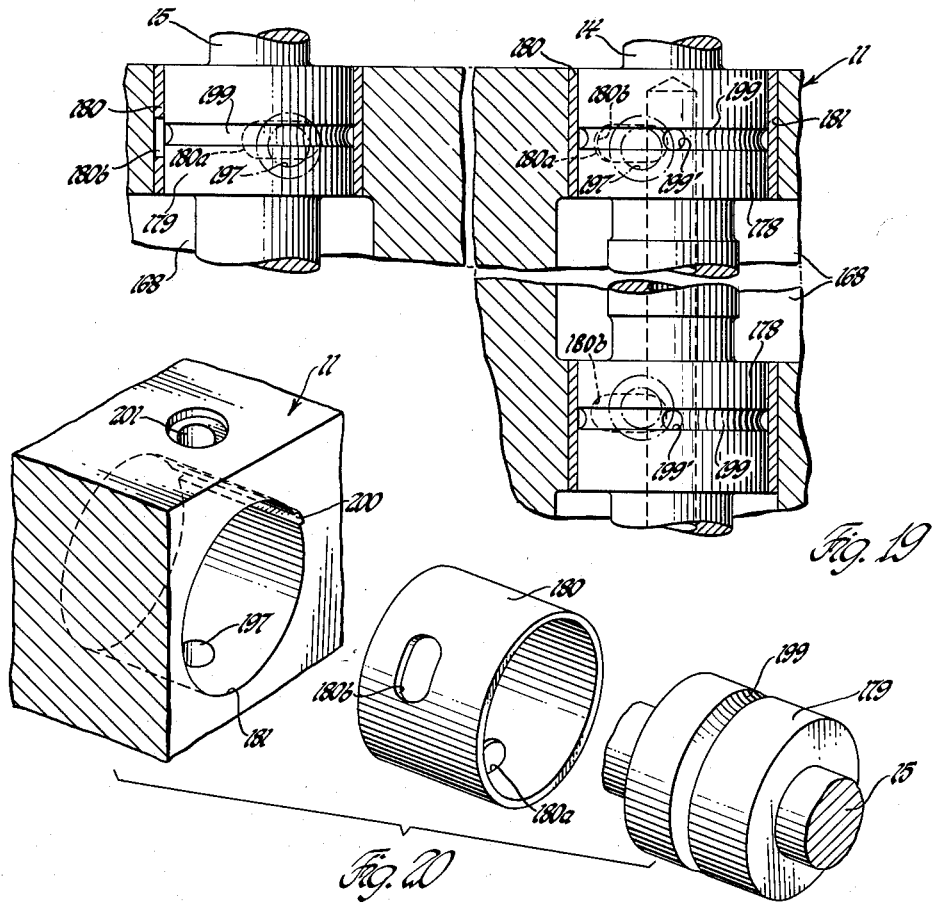
Fig. 19
Fig. 20
INVENTORS
George W. Conover,
BY Kenneth L. Halsing, &
Joseph Koehler
ATTORNEY United States Patent Office 3,094,190
Patented June 18, 1963

3,094,190
INTERNAL COMBUSTION ENGINE
George W. Conover and Kenneth L. Hulsing, Plymouth, and Joseph Koehler, Farmington, Mich., assignors to General Motors Corporation, Detroit, Mich., a corporation of Delaware
Filed June 8, 1960, Ser. No. 34,728
7 Claims. (Cl. 184—6)

This invention relates generally to internal combustion engines; more particularly to the design and construction of the several engine components and associated accessory mechanisms so that the various elements may be assembled to provide a multiplicity of configurations meeting different engine installation requirements; and with regard to certain more specific aspects of the invention to cylinder block and head constructions providing an improved lubrication and breathing arrangement for such engines.

In its broader aspects, the invention contemplates a series of multi-cylinder engines having substantial cylinder block symmetry about the longitudinal vertical plane of the engine and providing alternative accessory mounting locations on either side of the engine. Two counterdriven cam and balance shafts are journaled in the cylinder block in spaced parallel relation and are interchangeable to permit a cylinder head having substantial symmetry about its transverse median plane to reversed end-for-end in its mounting on the cylinder block thus providing alternative exhaust manifold locations. The contemplated block and head symmetry minimizes tooling requirements for the several engines of the series and provides maximum accessory versatility to meet various installation requirements.

In accordance with certain of its more specific aspects, the invention contemplates improved cylinder block and head components which are cast to provide a relatively light rigid girder-box construction; which are relatively easy and inexpensive to core, cast, clean and to machine; and which provide improved breathing, cooling and lubrication systems for such engines.

The invention embraces certain other features of the construction and in the combination and arrangement of the several parts as shown and described herein and specifically defined in the appending claims.

With regard to certain of its more specific aspects, the invention has particular application to internal combustion engine of the two-cycle uniflow scavenged type and is shown and described herein for illustrative purposes as incorporated in several engine installations of this type. However, the invention is not limited in its application to engines of this particular type and is considered to be applicable in its broader aspects to internal combustion engines generally.

The foregoing and other objects, advantages and features of the invention will be apparent and more thoroughly understood from the following description of several of various possible embodiments of the invention as illustrated in the accompanying drawings, in which:

FIGURES 2 and 2a show the basic engine structure of the invention in side elevational complementary views with portions broken away and in section to show certain internal details of the basic engine structure and of the accessory mounting and drive arrangement shown in FIGURE 1;

FIGURE 18 is an enlarged fragmentary elevational view showing the cam and balance shaft mounting upper portions of the engine cylinder block with portions broken away and sectioned to show the journalling and lubrication supply arrangement provided for such shafts in accordance with certain specific aspects of the invention;

FIGURE 19 is a fragmentary sectional view further illustrating the cam and balance shaft journalling and lubrication supply arrangement of the invention and is taken substantially in the direction of the arrows in the plane of the line indicated at 19—19 in FIGURE 18; and FIGURE 20 is a view showing a portion of a bearing supporting boss of the cylinder block, a bearing sleeve, and an end journal portion of the balancing shaft in exploded perspective elevation to further illustrate the shaft journalling and lubrication supply arrangement of the invention.

GENERAL DESCRIPTION

Figure 2A:
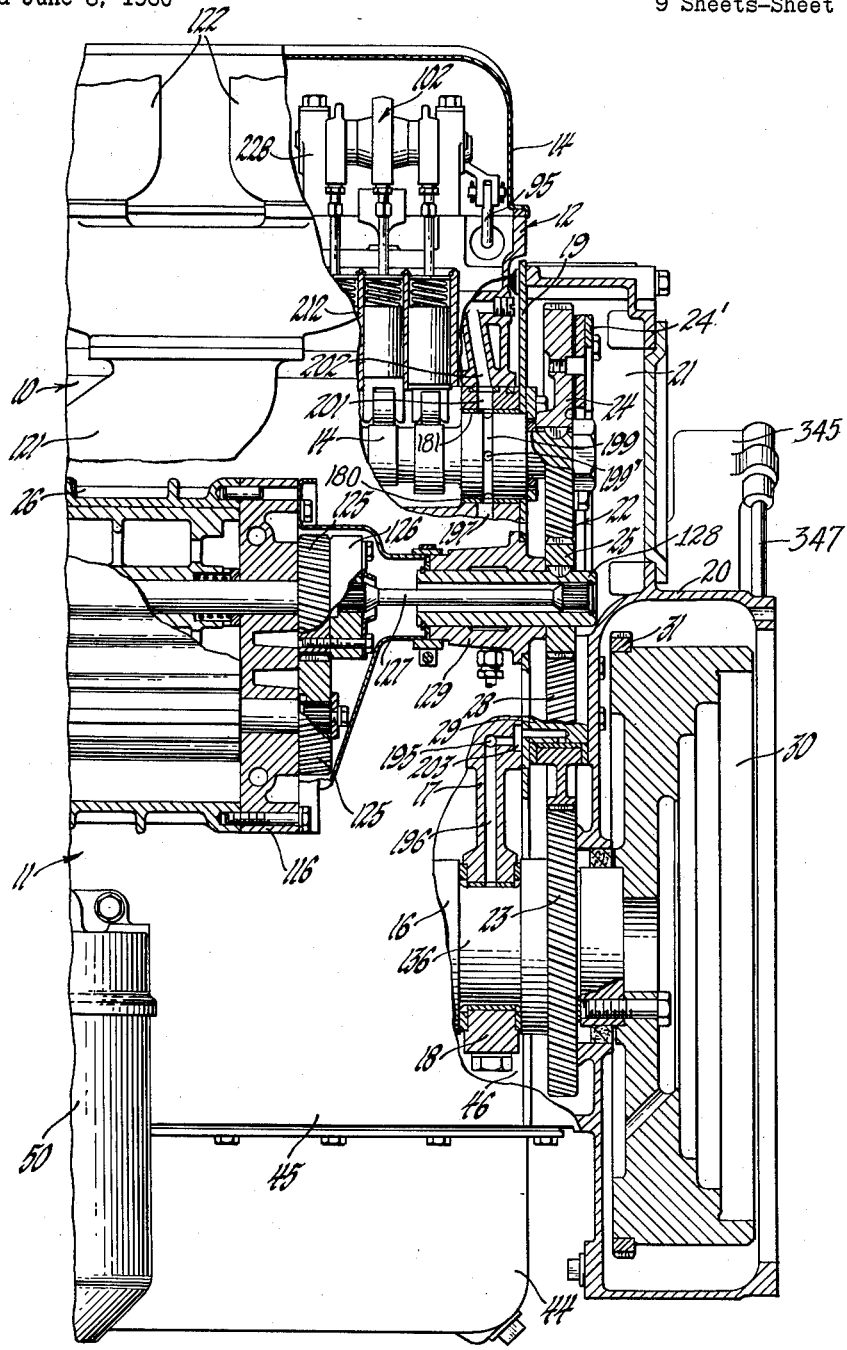
Figure 3:
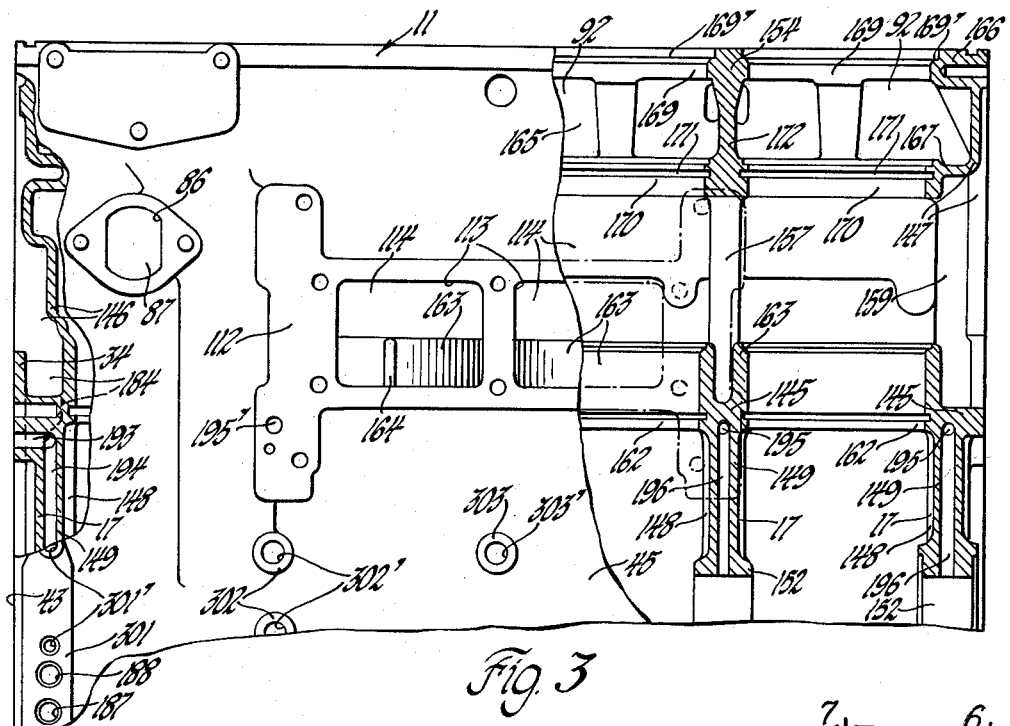
FIGURE 3 is a side elevatonal view of the cylinder block with portions thereof removed and in section to show certain structural details thereof.
Figure 4:
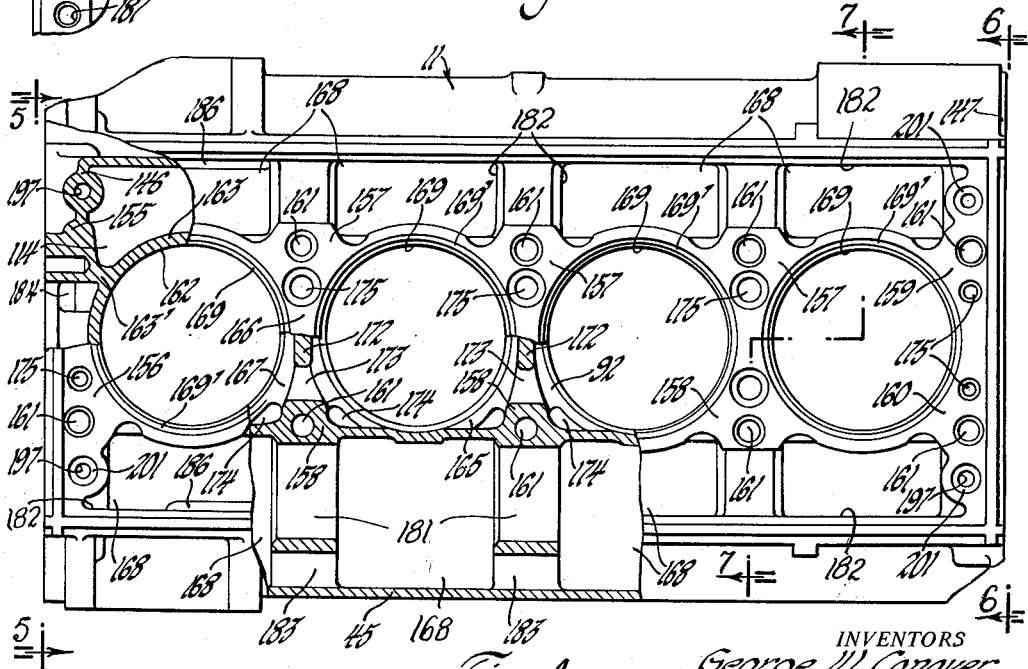
FIGURE 4 is a top elevational view of the cylinder block with portions thereof broken away and in section to show certain structural details thereof.

Referring more particularly to FIGURES 2 and 2a, a four-cylinder inline engine is indicated generally by the reference numeral 10 and is illustrative of a series of two-cycle uniflow scavenged multi-cylinder engines incorporating the various aspects of the invention. Each of the several engines comprises a block 11 which is substantially rectangular and has symmetry about a vertical median plane passing longitudinally therethrough. This block symmetry provides a plurality of alternative accessory mounting locations on the opposite side walls thereof. The upper portion of the block 11 defines several inline cylinders which are closed at their upper ends by a cylinder head 12 mounted on the upper face of the cylinder block. The cylinder head 12 is of the overhead valve and injector type and is provided with symmetry about its transverse median plane to permit end-for-end reversal on the cylinder block. A cover member 13 is secured to the cylinder head and defines a chamber housing the overhead valve and injector actuating mechanisms. A camshaft 14 and a balance shaft 15 are journaled in the upper portion of the cylinder block and extend longitudinally thereof in parallel spaced relation flanking the cylinder row. These shafts are counterrotated and carry engine balancing masses adjacent each end thereof. These shafts may be interchanged to provide a plurality of different engine models by the simple expedient of reversing the cylinder head end-for-end. A crankshaft 16 is rotatably supported in the lower portion of the cylinder block 11 by a plurality of longitudinally spaced transverse bearing supporting webs or arches 17 and caps 18 secured thereto.

An end plate 19 and a housing member 20 are secured to the rear of the cylinder block and define a chamber 21 therebetween. The chamber 21 houses an engine timing and accessory drive gear train 22 including a main gear 23 which is secured to the rear end of the crankshaft 16. Two gears 24 are secured to the ends of the camshaft and balance shaft within the gear housing chamber 21 and are drivingly interengaged to provide counterrotation of their respective shafts. The gears 24 are provided with phased engine balancing masses. These balancing masses are eccentric of their respective shaft rotative axes and may be formed either integrally with the gear or provided by separate weights secured thereto as indicated at 24' in FIGURE 2a. Two accessory drive gears 25 are disposed in flanking relation to the cylinder block, each being rotatably supported with respect to openings provided therefor in the end plate 19 and drivingly engaged by the adjacent gear 24. In the several illustrative embodiments, the gears 25 are used to drive an engine charging blower 26 and a centrifugal governor 27 which are mountable alternatively on opposite sides of the engine. One of the gears 24 is drivingly connected to the crankshaft gear 23 through an idler gear 28 which is journaled on a stub shaft 29 which is secured to the rear of the cylinder block. To provide proper driving rotation of the blower, the idler gear mounting stub shaft may be mounted either at 29' or 29" depending upon the direction of crankshaft rotation and the mounting location of the blower 26.

The lower portion of the gear housing member 20 defines a bell chamber wherein a flywheel 30 is drivingly secured to the rear end of the crankshaft as shown in FIGURE 2a. This bell housing portion of the member 20 further cooperates with the end plate to close the rear crankcase portion of the cylinder block. A ring gear 31 is carried by the flywheel 30 and is drivingly engageable with the pinion gear of a starter drive mechanism 32. This starter mechanism is preferably of a conventional electric or hydraulic motor type. The starter drive mechanism is supported by the bell housing and may be mounted on either side of the engine.

At the front of the engine, an end plate 33 is secured to and mates with an end face 34 on the upper block portion. The front end plate 33 defines an oil drain and breathing compartment 35 with the front of the block. As indicated at 36, two openings in the end plate 33 spacedly embrace and are sealed wtih respect to the forwardly projecting ends of the cam and balance shafts. A combined balance weight and V-belt pulley member 37 is secured to each of these forwardly projecting shaft ends. These pulley members are recessed to provide eccentric balancing masses which are disposed in 180° phased relation to the gear carried balance weight 24' at the rear of the engine. For safety, the front end plate 33 is extended to provide a guard flange 38 shielding the uneven weight defining rear face of the balance weight pulley members 37. A bracket assembly 39 is secured to the front end plate 33 and bridges the balance weight pulley members 37 in the vertical median plane of the engine. This bracket assembly is vertically adjustable and journals a stub shaft 40. A V-belt pulley member 41 is carried by the stub shaft 40 and provides a hub to which a suitable fan member may be attached.

The lower crankcase portion is closed at the front of the block by a combined cover and gear pump assembly 42 which is secured to and mates with the lower front face 43 of the cylinder block. An oil pan member 44 is secured to the lower crankcase defining side walls 45 of the cylinder block and to coextensive bottom surfaces on the gear housing member 20 and the pump assembly 42, respectively, and cooperates therewith to define a crankcase and oil sump chamber 46. As explained in somewhat greater detail below, the combined cover and gear pump assembly 42 embraces the crankshaft 16 adjacent its forward end and the gear pump unit of the assembly is driven directly off the crankshaft and serves to supply pressurized oil for lubrication and cooling of the various engine components and accessories. A pulley member 47 is secured to the forward end of the crankshaft and is drivingly connected by V-belts 48 to the fan mounting pulley 41.

The intake of the pump 42 is located in the sump chamber 46. Alternative outlets are provided from the discharge chamber of the pump. These outlets are connectable through alternative passages in the crankcase side walls to a support or adapter member 49. This adapter member is adapted to mount an oil filter unit 50 and an oil cooler unit 51 on either crankcase side wall depending upon the desired oil filter and cooler location. The adapter member 49 provides passage means from the pump outlet through the filter unit 50 and the cooler unit 51 and back through a second angled passage in the adjacent crankcase side wall to a distribution passage extending transversely of the pump cover assembly 42. This pump distribution passage has several outlet ports which mate with ports opening on the lower front end face of the block. These last mentioned ports lead to several oil distribution passages extending through the cylinder block.

A centrifugal coolant pump 52 is secured to and supported by a mounting boss or flange 53 formed on the housing 54 of the oil cooler unit 41. The pump 52 includes a housing 55 and a cover member 56 which define a pumping chamber 57 therebetween. An impeller shaft 58 is journaled in the pump housing 55. One end of the shaft 58 is sealed with respect to and projects into the pumping chamber where it drivingly supports a vaned impeller 59. The opposite end of the impeller shaft projects outwardly of the pump housing and mounts a V-belt pulley member 60. A scroll portion 61 of the pump housing partially embraces the pumping chamber and defines a discharge passage communicating downwardly with a coolant inlet port which is provided in the pump mounting flange of the oil cooler housing member 54. An annular inlet chamber 62 opens centrally of the pumping chamber 57 and is connectable through mating passages 63 and 64 in the pump and oil cooler housing members, respectively, to the outlet of an engine radiator or other suitable heat exchange device, not shown. A second radiator bypass inlet 65 opens on the central inlet chamber 62 of the pump opposite the inlet passage 63.

The second pump inlet 65 is connected by suitable tubing 66 to a port 67 which opens to a bypass chamber 68 defined by a thermostatic valve housing 69 secured to and carried by the front end wall of the cylinder head. The valve housing member 69 further defines an inlet chamber 70 which is separated from the bypass chamber 68 by a partition web 71. An inlet port 72 opening to the chamber 70 mates with a port 73 opening through the front head wall to the cylinder head water jacket compartment 74. The inlet chamber 70 is connectable through a valve controlled port 75 in the partition web 71 to the bypass outlet chamber. The upper wall of the valve housing 69 has a second port 76 in axial alignment with the port 75. This second port is connectable through a suitable fitting 77 secured to the upper valve housing wall and tubing, not shown, to an inlet header of the radiator or heat exchange device. A thermostatic valve unit 78 of a full-flow, blocking type is mounted in the valve housing and is operable to distribute or block fluid flow through either the bypass port 75 or the radiator outlet port 76 in accordance with the coolant temperatures in the inlet chamber 70.

The impeller drive pulley 60 of the coolant pump is drivingly connected by V-belts 79 to the balance weight pulley member 37 carried by the adjacent cam or balance shaft. The V-belts 79 also drivingly engage a pulley member which is carried by the drive shaft of a generator unit 82 or similar engine accessory unit pivotally mounted on the engine for swinging take-up adjustment of the several V-belts.

To accommodate mounting of the oil cooler, filter and coolant pump assembly on either side of the engine, two alternative coolant inlet ports 86 are symmetrically disposed in the opposite side walls of the cylinder block. Each of the ports 86 open to one of two coolant distribution galleries 87 which extend longitudinally of the block in flanking relation to the cylinder row. The port 86 on the oil cooler mounting side of the block is connected by a fitting 88 and a tube 89 to a flanged coolant outlet 90 formed on the oil cooler housing 54. The coolant pumping displacement effected by driving rotation of the pump impeller is thus discharged through the oil cooler unit and into one of the coolant distribution galleries 87 of the block. From the distribution gallery, the coolant passes into the several cylinder jacket compartments 92 of the block and therefrom into the coolant compartment 74 of the cylinder head.

As indicated above, the engine governor 27 may be alternatively mounted on either side of the rear end plate 19 and driven by the adjacent accessory drive gear 25. The governor may be of any suitable type but in the engine configuration of FIGURE 1, the governor 27 has a speeder spring control 93 located adjacent the accessory gear driven flyweight mechanism. The power output lever 94 of this governor is operatively connected through a linkage 95 to an injector rack control tube 96 which is journaled above the cylinder head by two spaced brackets 97. A plurality of lever arms 98 are longitudinally spaced on and secured to the injector control tube. These lever arms have lost motion pivotal connections with fuel control racks 99 which are transversely shiftable to control the fuel supply characteristics of unit type fuel injectors 100. The several fuel injectors 100 are mounted in the cylinder head in coaxial relation with the several inline cylinders and are sequentially operable to supply measured quantities of fuel to their respective cylinders. Such injector operation is provided by camshaft actuation of the several injector plungers 101 through a cam follower linkage 102 of the overhead rocker type.

With either form of governor, the flyweight housing of the governor serves to support a fuel circulating pump 103. This pump is driven off the centrifugal flyweight assembly of the governor and is preferably of a gear type similar to that shown and described in copending United States Patent No. 3,023,706 issued March 6, 1962, to James O. McVicar and Albert DeFezzy and entitled, "Gear Pump and Relief Valve." The fuel pump has a fluid inlet connection 104 through a filter unit 105 to the fuel supply tank, not shown, and an outlet connection 106 through a second filter unit 107 to a fuel distribution manifold 108 which is formed integrally of and extends longitudinally of the cylinder head. From the manifold 108, the pump supplied fuel is circulated through the several injector units by fluid connections 109 and 110 for fuel supply and injector cooling purposes. The several fuel connections 110 are connected through a return manifold 111 extending longitudinally of the cylinder head to the fuel supply tank.

Each side wall of the cylinder block has a boss 112 thereon. These bosses are finished to provide alternative blower mounting locations on opposite sides of the engine. These bosses further define ports 113 which extend through the side walls of the block and open to an air box 114 extending longitudinally of the block immediately above the crankcase. The ports 113 in the side wall opposite the blower provide inspection access to the engine air box and are normally closed by a cover member 115.

The blower assembly 26 is of a positive displacement type such as shown and described in copending United States Patent No. 3,059,835, issued October 23, 1962 to Kenneth L. Hulsing and George P. Hanley and entitled, "Rotary Blower," and need not be described in detail. Briefly, the blower assembly includes a housing 116 defining a blower chamber 117 and journaling two lobed impellers 118 having pumping interengagement and rotative sealing clearances with the adjacent side walls of the chamber 117. The blower housing has an outlet port 119 mating with the air box inlet ports 113 and an inlet port 120 which is connected through an inlet elbow 121 to a suitable air cleaner assembly partially indicated at 122 in FIGURES 2 and 2a. The inlet elbow 121 pivotally supports a shut-down flap valve 123 which is maintained in an opened position during engine operation by a latch indicated at 124 in FIGURE 1. The lobed impellers 118 are synchronously driven by two gears 125, one of which is drivingly connected through a spring pack coupling 126 and a quill shaft 127 to the hollow shaft 128. The shaft 128 is journaled in a support hub 129 carried by the end plate 19 and projects into the gear chamber 21 where it drivingly supports the adjacent accessory gear 25.

Figure 1:
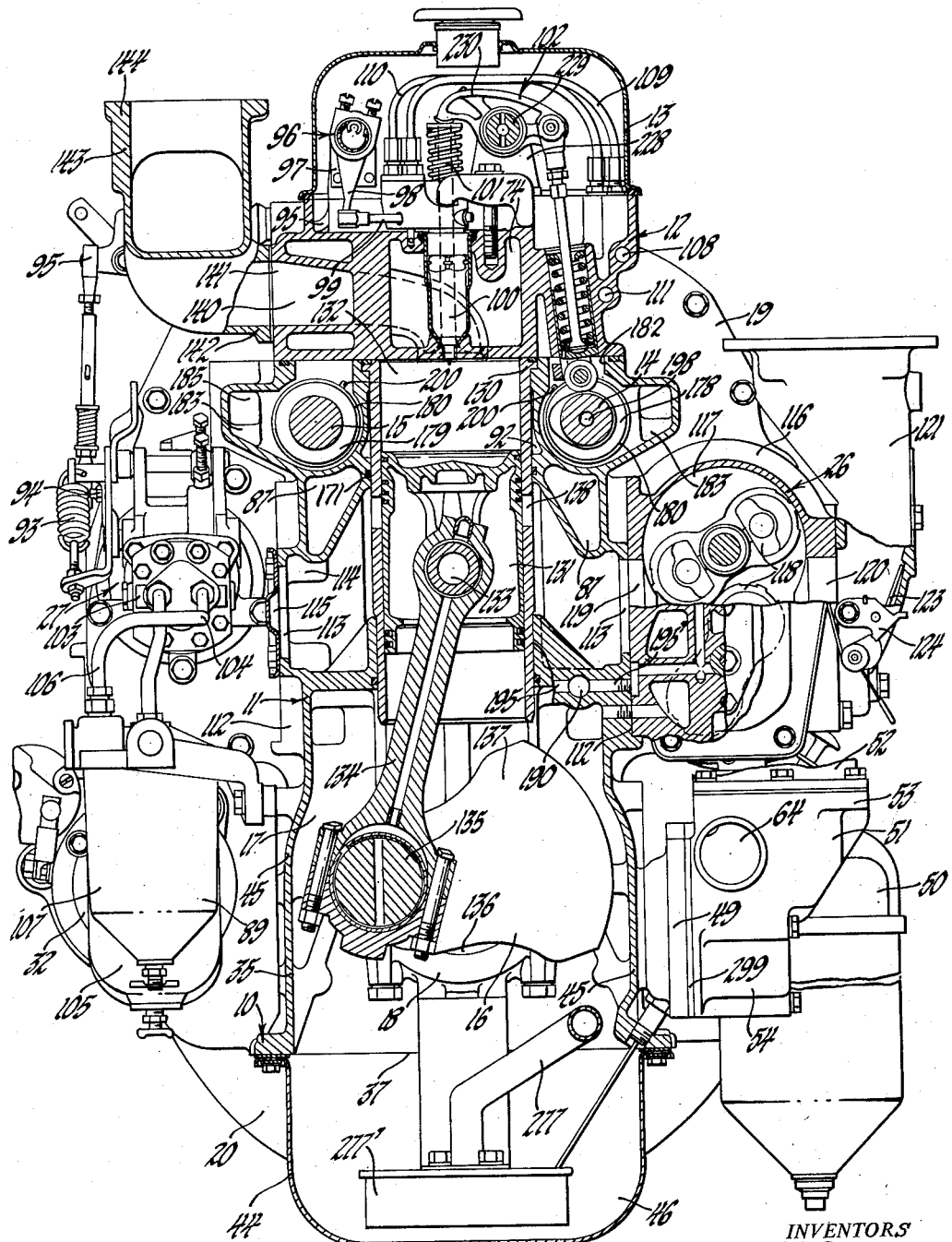
FIGURE 1 is a transverse sectional view of a two-cycle internal combustion engine illustrative of one of the engine accessory mounting and drive arrangements permitted by the basic engine structure of the invention.

It will be noted from the illustrative engine configuration so far described, FIGURES 1–4, that the engine blower 26 and the starter mechanism 32 might be alternately mounted on the right side of the engine, as viewed in FIGURE 1, opposite the mounting of engine accessory group comprising the oil cooler and filter assembly 49—51, the coolant pump 52 and the generator 82. In such an alternate engine configuration, the engine governor 27 and the fuel pump 103 supported and driven thereby and the fuel filters 105 and 107 would be mounted on the same side of the engine as the oil cooler and filter units. In the engine configuration of FIGURES 1, 2 and 2a, the oil cooler and filter assembly, the coolant pump and the generator are mounted on the same side as the blower, the right hand side of the engine as viewed in FIGURE 1, and the starter mechanism 32 is mounted on the left hand side of the engine together with the governor, the fuel pump and the fuel filter units.

As shown in FIGURE 1, the upper portion of the cylinder block mounts several cylinder defining liners 130 which are inline and closed at their upper ends by the cylinder head 12. Pistons 131 are reciprocably mounted in each of the several cylinders and cooperate with the closed ends thereof to form expansible combustion chambers 132 therebetween. Each piston is connected by a wrist pin 133 and a connecting rod 134 to the adjacent crankpin or throw 135 of the crankshaft. The several crankpin portions partially overlap and are supported between the main crankshaft journal portions 136 by crank throws 137. The several crank throws carry balancing masses which counterbalance the rotating and reciprocating engine unbalance and reduce the loads imposed on certain of the main bearings.

A circumferential belt of inlet ports 138 is formed intermediate the ends of each liner. These ports open to the air box 114 and reciprocation of the several pistons serves to control the admission of scavenging and charging air to their respective cylinders. Uniflow scavenging of the exhaust gases is accomplished by the simultaneous camshaft timed opening of the overhead exhaust valves. These exhaust valves are reciprocably mounted in the cylinder head and control valve seating ports 139 opening to exhaust passages 140. The exhaust passages 140 are formed integrally of the cylinder head and terminate in ports 141 opening in the side face of the cylinder head opposite the fuel manifolds and the camshaft 14. The several ports 141 mate with branch passages 142 of an exhaust manifold 143. The exhaust manifold is provided with a single outlet at 144 and is formed symmetrically about the transverse median plane of the cylinder head. This symmetry permits the exhaust manifold to be mounted with its outlet directed either upwardly or downwardly and on either side of the engine with reversal of the cylinder head.

*Cylinder Block Structure*
*Description of FIGURES 3–8*

As indicated above, the cylinder block structure shown in the section of FIGURE 1 embodies the broader fundamental aspects of the invention as well as the more specific aspects relating to the block structure per se.

As shown in FIGURES 3–8, the cylinder block structure includes a partition wall or deck 145 separating the crankcase chamber 46 from the air box chamber 114. This partition deck extends transversely and longitudinally between the front, rear and side walls of the block 146, 147 and 45, respectively, intersecting and laterally supporting the several bearing supporting webs 17. Vertical ribs 148 and 149 and transverse ribs 150 and 151 further reinforce the bearing supporting webs 17 and terminate in main bearing supporting arches 152. A water-jacket-and-camshaft-gallery-defining portion 154 extends longitudinally of the upper portion of the block and supports the upper combustion chamber ends of the several cylinder liners in spaced relation to the partition wall 145. This upper block portion is connected to the crankcase defining partition wall by the front, rear and side walls of the block and by a plurality of columns 155, 156, 157, 158, 159 and 160 which extend therebetween intermediate the several cylinders and adjacent each end of the block. The several columns 155—160 are coextensive with the ribs 148 of the bearing arch supporting webs 17 and extend upwardly through the upper cylinder supporting portion 154. These columns are bored and tapped adjacent their upper ends at 161 to receive bolts securing the cylinder head to the upper face of the cylinder block.

A plurality of ports 162 extend through the crankcase defining partition 145. The ports are defined by cylindrical muffs or flanges 163 which extend upwardly from the partition deck and slidably and sealingly support the lower ends of the several cylinder liners. These liner supporting muffs are reinforced by radial webs extending to the several adjacent columns 155—160, as indicated at 163' in FIGURE 4. The two intermediate cylinder muffs 163 are further reinforced by webs 164 extending radially to the crankcase defining partition wall 145.

The upper block portion 154 defines a longitudinally extending central water jacket gallery 165 which embraces the upper combustion chamber ends of the several cylinders. This water jacket gallery is defined between two longitudinally extending decks 166 and 167 and flanked by two longitudinally extending galleries 168 which alternatively mount either the camshaft 14 or the balance shaft 15. The spaced water jacket defining decks 166 and 167 have a plurality of ports 169 and 170 extending therethrough, respectively. These ports are in coaxial alignment with the ports 161 defined by the lower liner supporting muffs 162 and the partition wall 145. As best seen in FIGURE 1, the ports 169 and 170 slidably support the upper combustion chamber ends of the several cylinder liners. The liners are sealed with respect to the ports 170 by O-ring seals indicated at 171. The upper flanged end of each liner is sealed by abutment with an annular port defining shoulder 169' and with the cylinder head gasket. Partition webs 172 extend between the decks 166 and 167 intermediate the several cylinder supporting ports and the columns 157 and 158. These partition webs reinforce the upper liner supporting block portion 154 and provide ports 173 restricting cooling water flow longitudinally of the central water jacket gallery. The partition webs 172 thus divide the central water gallery into a plurality of interconnected water jacket compartments 92 which embrace and equalize coolant flow about the upper ends of the several cylinders. This limited and equalized liquid cooling serves to minimize the thermal load variations imposed on the upper combustion chamber ends relative to the relatively cooler intermediate and lower portions of the several liners. The cooling applied to these lower liner portions is limited to the effect of the air box air flow and conductive heat transfer to the several liner supporting muffs.

Figure 7:
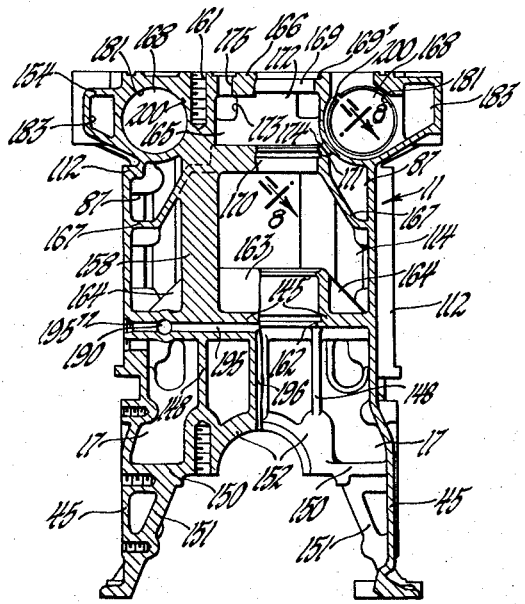
FIGURE 7 is a transverse sectional view of the cylinder block and is taken substantially in the direction of the arrows and in the plane of the line indicated at 7—7 in FIGURE 4.
Figure 8:
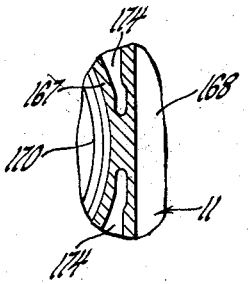
FIGURE 8 is a fragmentary section view taken substantially in the direction of the arrows and in the plane of the line indicated at 8—8 in FIGURE 7.

As best seen in FIGURES 7 and 8, the several water jacket compartments are connected to the two water distribution galleries or manifolds 87 through a plurality of ports 174 opening therebetween intermediate the several cylinders. The galleries 87 extend longitudinally of the block immediately below the camshaft galleries 168 and are separated from the block defined air box by the liner supporting deck 167. As previously indicated, the water distribution galleries 87 have inlet ports 86 opening through the opposite side walls of the block adjacent the front of the engine. These inlet ports are alternatively connectable to the water outlet connection of the adjacent block mounted oil cooler unit. The cooling water thus supplied to the several jacket compartments of the block is drawn upwardly by the suction of the coolant pump into the water jacket compartment 74 of the cylinder head through mating ports 175 and 176 in the upper block deck 166 and the lower combustion chamber defining deck or wall 177 of the cylinder head.

Figure 5:
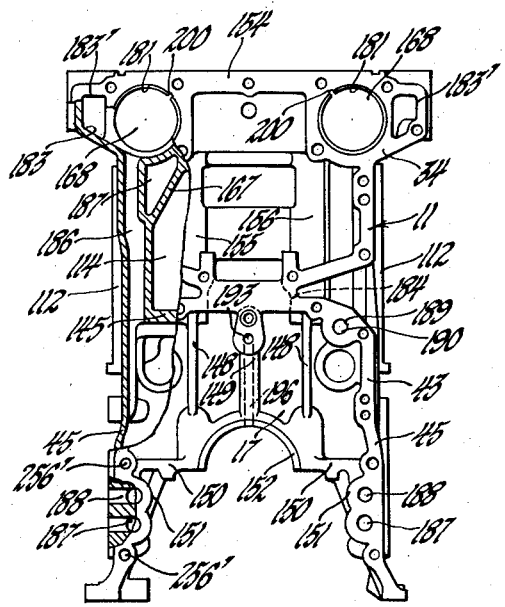
FIGURE 5 is a front elevational view of the cylinder block with portions thereof broken away and in section and is taken in the direction of the arrows indicated at 5—5 in FIGURE 4.
Figure 6:
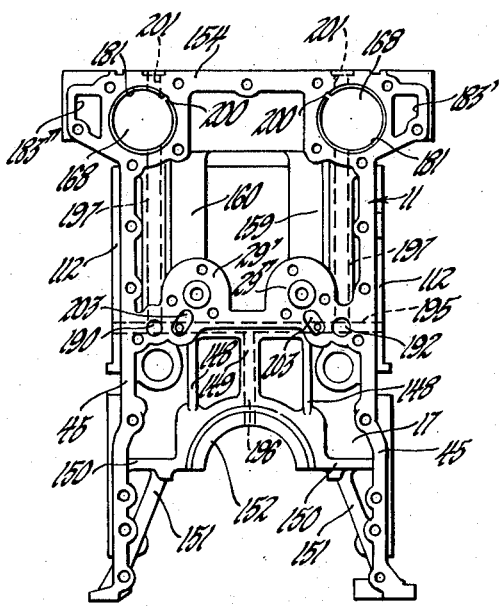
FIGURE 6 is a rear elevational view of the cylinder block taken in the direction of the arrows indicated at 6—6 in FIGURE 4.

The cam and balance shafts 14 and 15 have spaced barrel-type journals 178 and 179, respectively. These journals are rotatably supported by relatively thin bearing sleeves 180 mounted and preferably finished within mounting bores 181 formed in bosses spaced longitudinally of the galleries 168. This mounting of the shafts divides the galleries 168 into a plurality of compartments. A plurality of ports 182 open into the several gallery compartments through the upper deck 166 of the block intermediate the several bearing supporting bosses. These gallery ports mate with various ports and passages which extend through the cylinder head and provide oil drainage and breathing from the overhead rocker cover compartment. Oil drainage and breathing of the shaft galleries 168 is provided through a plurality of ports 183 which are located immediately outboard of the several bearing mounting bosses and longitudinally interconnect the several gallery compartments. As best seen in FIGURES 2 and 5, the front end ports 183' open to the oil drain compartment 35 defined between the front upper wall 146, the end face defining wall 34 and the plate 33 secured thereto. The front oil drain compartment is connected through a block defined passage 184 to that portion of the crankcase chamber intermediate the front main bearing web 17 and the combined cover and oil pump assembly 42. At the rear of the engine the ports 183" mate with ports 185 in the rear end plate 19 providing drainage and breathing communication with the crankcase through the timing gear chamber 21. As best seen in the broken away section of FIGURE 5, additional drainage and breathing communication is provided between the shaft galleries 168 and the crankcase by passages 186 formed integrally of the side walls 45 adjacent the front of the cylinder block. Similar drain passages may be provided adjacent the rear of the block. These drain passages further serve to structurally reinforce the blower mounting air box portions of the side walls 45.

Figure 9:
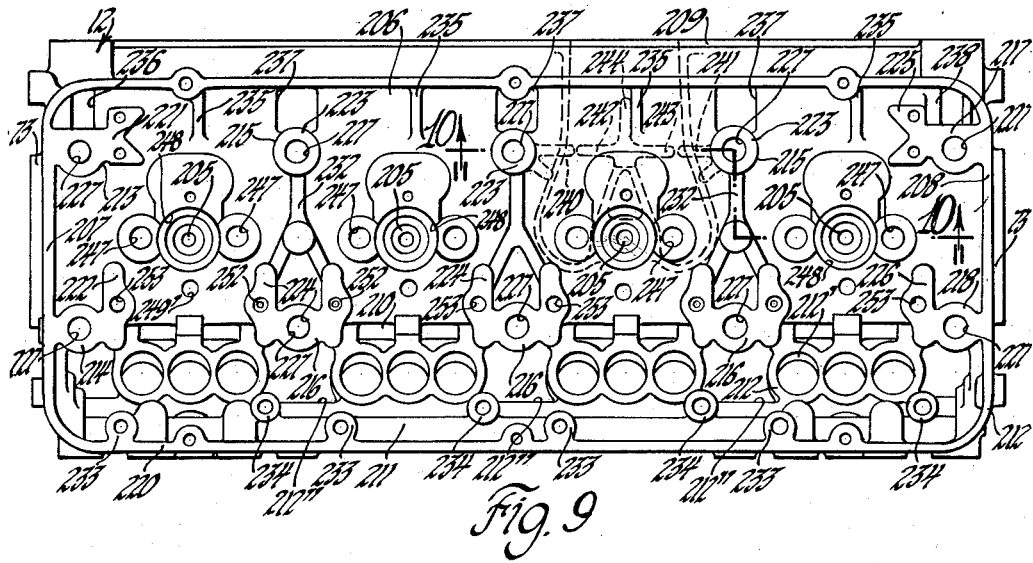
FIGURE 9 is a top elevational view of the cylinder head with portions thereof broken away and in section.
Figure 10:
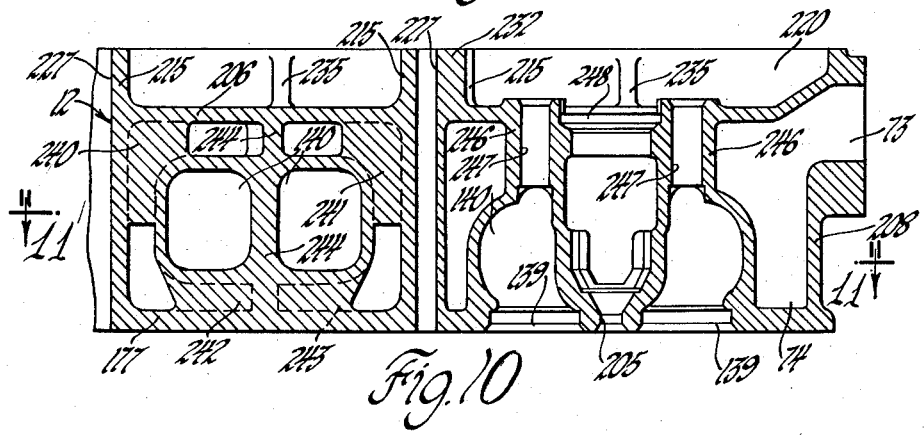
FIGURE 10 is a sectional view of a portion of the cylinder head and is taken substantially in the direction of the arrows and in the plane of the line indicated at 10—10 in FIGURE 9.
Figure 11:
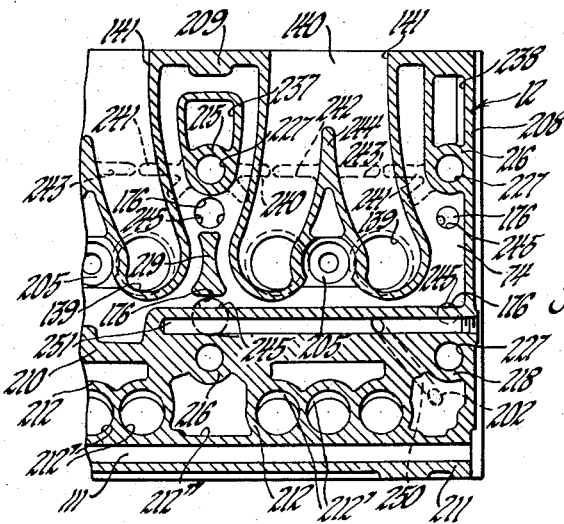
FIGURE 11 is a sectional view of a portion of the cylinder head and is taken substantially in the direction of the arrows and in the plane of the line indicated at 11—11 in FIGURE 10.

*Cylinder Head Construction*
*Description of FIGURES 9–11*

As indicated above, the cylinder heads 12 are reversible end-for-end to provide alternative engine profile configurations for the several inline engines. Such head reversibility also permits alternative use on either bank of a V-engine derived from the basic inline engine design in the manner shown and described in copending United States patent application Serial No. 1,488, filed January 11, 1960, in the names of Harold H. Albinson, George P. Hanley, Kenneth L. Hulsing, Harvey G. Humphries, and John J. May, and entitled, "Two-Cycle Internal Combustion Engine." To provide this end-for-end reversibility, each cylinder head 12 is provided with symmetry about its transverse median plane. This is best seen in the plan elevational view of FIGURE 9.

The lower combustion chamber defining wall or deck 177 of the cylinder head is preferably of relatively thin wall construction. This lower deck mates with and is suitably sealed with respect to the upper flanged ends of the several cylinder liners and to the upper deck 166 of the cylinder block. The valve seat defining exhaust ports 139 open through the lower deck in radially spaced relation about ports 205 which support the nozzle ends of the several fuel injectors 100 centrally of their respective combustion chambers. An upper deck 206 extends longitudinally and laterally of the head in spaced parallel relation to the lower deck 177. This upper deck is connected to the lower deck by end walls 207 and 208, a side wall 209 and by a water jacket defining partition wall 210. A second side wall 211 extends longitudinally of the head in substantially spaced relation to the partition wall 210 and defines the fuel supply and return manifolds 108 and 111. The side wall 211 is structurally tied to the water jacket wall 210 by a plurality of longitudinally spaced bridges 212. These bridges define tappet guide ports 212' and ports 212" which provide overhead oil drainage and breathing to and through the adjacent camshaft gallery 168.

In addition to the side, end and partition walls, the upper and lower decks are structurally interconnected by a plurality of columns or struts 213, 214, 215, 216, 217, and 218. These struts are alignable with the corresponding struts 155—160 of the cylinder block structure. The several inline struts 214, 216 and 218 are intersected and structurally interconnected by the water jacket partition wall 210 and the tappet guide bridges 212. The opposite inline struts define passages 236, 237 and 238 which extend between the upper and lower decks and provide oil drainage and breathing to and through the adjacent balance shaft gallery. The upper and lower decks are further interconnected by partition webs 219, which extend therebetween in spaced transverse alignment with the struts 215 and 216, and by a plurality of webs or struts 240, 241, 242, 243, and 244 which serve to support the several exhaust passage structures intermediate the several inline struts 213, 215, and 217. Of the several exhaust passage supporting webs, the upper webs 240 and 241 extend between the upper deck, the struts 213, 215, and 217, and the adjacent exhaust passage defining walls; the lower webs 242 and 243 extend between the lower deck and the lower passage defining wall; and the struts 244 are coextensive with the junctures of the several exhaust passage branches and extend vertically and transversely between the upper and lower decks.

The partition webs 219 and the several exhaust passage supporting webs or struts 240—244 divide the main jacket compartment 74 of the head into a plurality of smaller combustion chamber jacket compartments embracing the several fuel injectors and the valve controlled ends of the several exhaust passages 140 and a longitudinally extending internal manifold embracing the manifold port ends of the several exhaust passages. Orifice nozzles 245 are mounted in the several water inlet ports 176 and direct the incoming water flow from the cylinder block into the several combustion chamber compartments and onto the valve seat defining ends of the adjacent exhaust passages and upwardly about the fuel injectors. The several combustion chamber jacket compartments are longitudinally interconnected by ports defined by the several struts 215, 216 and 219. This interconnection permits limited longitudinal cooling water flow through the several compartments to the water outlet 73 at the front of the head. A substantial portion of the cooling water supplied, however, is drawn laterally through the ports defined by the exhaust passages and their supporting webs 240—244 and into the longitudinally extending internal manifold adjacent the side wall 209. This latter portion of the cooling water is then drawn forwardly through the internal manifold over the outer ends of the several exhaust passages and out through the front water outlet 73. This arrangement of the cylinder head jacket compartment 74 cooperates with the equalized water distribution of the block to provide substantially equalized cooling of the several combustion chamber end walls, valve seats, injectors, etc. of the head and minimizes the thermal distortions which might otherwise be imposed on such members.

As shown in FIGURE 1, the rocker cover 13 is sealingly secured to an upstanding peripheral wall or flange 220 which is carried by the upper deck 206 and cooperates therewith to define an overhead compartment housing the several valve and injector actuating mechanisms. Within its flange defined portion, the upper deck 206 carries a plurality of bosses 221, 222, 223, 224, 225, and 226. The several internal struts or columns 213—218 are coextensive with these bosses and have bores 227 extending therethrough to receive the several cylinder head mounting studs or bolts. In addition to providing abutment surfaces for the cylinder head mounting bolts, the several bosses 222, 224, and 226 mount brackets 228 which in turn support pivot shafts 229 for the several valve and injector actuating rocker arms 230. The bosses 223 and 225 similarly serve to mount support brackets 231 for the injector control tube 95. Upstanding ribs or flanges 232 and 232' extend transversely of the upper deck between the several bolt bosses 215 and 216 to form integral bridges reinforcing the head intermediate the several cylinders. Intermediate portions of these ribs are coextensive with the webs 219.

The cylinder head side wall 211 is also provided with a plurality of upstanding bosses 233 and 234. These bosses define fuel supply and return ports opening to the fuel manifolds 108 and 111, respectively. The several supply port defining bosses 233 are integral with and serve to structurally reinforce the adjacent side wall of the peripheral flange 220. The opposite side wall of the flange 220 is reinforced by a plurality of ribs 235. These ribs extend laterally and downwardly from the flange 220 to the upper deck 206 where they partially overlap the exhaust passage supporting struts 244. The end walls of the flange 220 are structurally intersected and reinforced by the adjacent bosses 213, 214 and 217, 218. The bosses 221—226, 233 and 234 are preferably of a height to permit coplanar finishing of their upper end faces with the cover mounting face of the peripheral flange 220. Such coplanar finishing eliminates expensive profile milling of the several bosses and permits milling of both the upper and lower surfaces of the head in a single pass through appropriate milling station.

In addition to the webs 240 and 241 and the struts 244, the upper walls of the several exhaust passages 140 are supported relative to the upper deck 206 by a plurality of sleeve portions 246 extending therebetween. These sleeves define a plurality of bores 247 which are in axial alignment with the valve seat defining exhaust ports 139 and support guide bushings for the exhaust valves. The cylinder head upper deck is also provided with a plurality of bores 248 in line with and centrally disposed of the paired valve mounting sleeves. These bores are in axial alignment with the injector nozzle supporting bores 205 of the lower deck and serve to support the upper barrel ends of the several fuel injectors 100. Clamps 249 are bolted to the head at 249' and secure the several fuel injectors in their respective mounted positions.

It will be seen that the girder box construction of the cylinder head 12 imparts maximum rigidity to the head with a minimum of metal mass, all of the main wall and partition webs being of relatively thin section. This lightweight head rigidity cooperates with that of the associated cylinder block and contributes to overall engine lightness. The resultant cylinder head is relatively inexpensive to manufacture, the head casting being relatively simple to core, cast, clean and inspect and easily machined.

Figure 12:
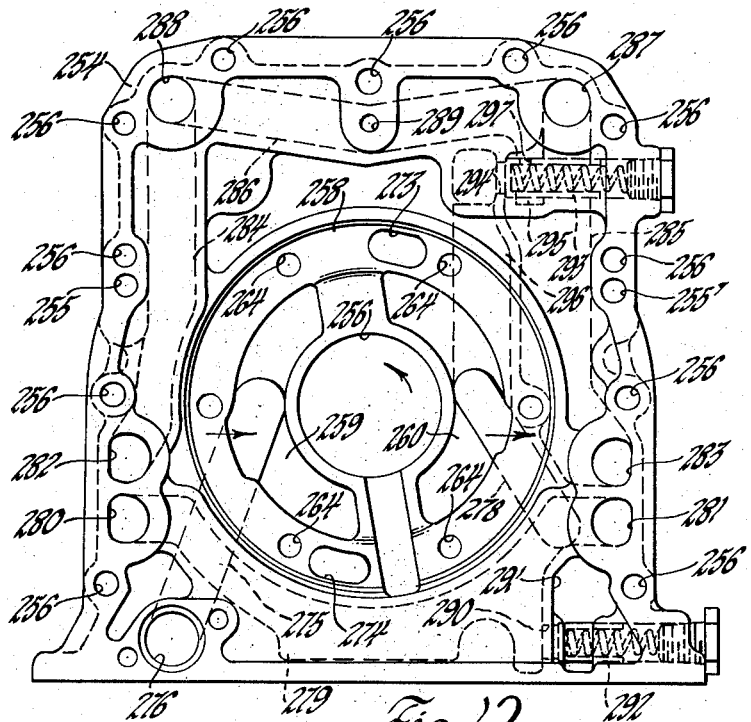
FIGURE 12 is a detail elevational view of a combined crankcase cover and pump housing member and is taken substantially in the direction of the arrows and in the plane of the line indicated at 12—12 of FIGURE 2.
Figure 14:
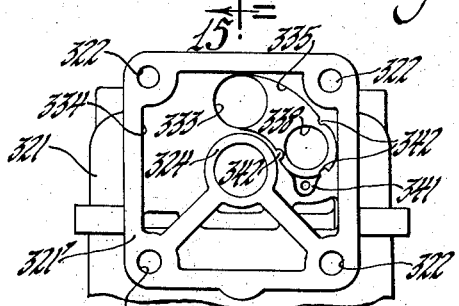
FIGURE 14 is an elevational view showing certain details of an oil filter base member which is mountable on the adapter member of FIGURE 16 and cooperates therewith to provide a plurality of oil filter mounting locations.
Figure 13:
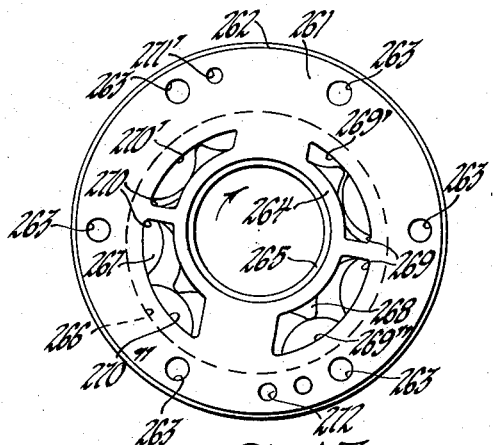
FIGURE 13 is an elevational view showing a crankshaft driven gear pump assembly mountable on the cover member of FIGURE 12 and shows the pump assembly substantially in the direction of the arrows and in the plane of the line 13—13 of FIGURE 2.

*Combined Front Crankcase Cover and Oil Pump Assembly Description of Figures 12 and 13*

Referring now to FIGURES 12 and 13, the combined front crankcase cover and oil pump assembly 42 includes a crankcase cover member 254. This cover member is located with respect to the lower front face 43 of the cylinder block by two pins at 255 and sealingly secured thereto by a plurality of bolts which extend through bolt holes 256 and threadably engage tapped holes 256' in the block. A bore 257 extends through the cover member 254. As seen in FIGURE 5, this bore spacedly embraces the forward end of the crankshaft 16 and a seal 257' is imposed therebetween. The crankcase side of the cover member has a boss or finished surface thereon defined in part by an annular portion 258. This annular surface is in spaced concentric relation to the bore 256, and thus to the rotative axis of the crankshaft, and is intersected by a diametrically extending boss surface 258'. The cover member is recessed inwardly of these intersecting surface portions to define an inlet chamber 259 and an outlet chamber 260.

A pump housing comprising a port plate 261 and a body member 262 is sealingly secured to the annular surface 258. This mounting of the pump housing is preferably accomplished by a plurality of bolts which extend through equiangularly spaced bolt holes 263 in the body and plate members and threadably engage corresponding tapped holes 264 in the cover member 254. The plate and body members 261 and 262 have crankshaft embracing bores 264 and 265, respectively, extending therethrough. The body member is provided with an eccentric counterbore 266. This counterbore cooperates with plate member to define a pump chamber and rotatably journals an impeller gear member 267. This outer gear is provided with internal teeth or lobes and is rotatably driven by the teeth of an inner impeller gear 268. As seen in FIGURE 2, the inner impeller gear 268 is drivingly connected to the crankshaft by a splined hub 268' keyed to the crankshaft. The eccentricity of the driving and driven gears 268 and 267 and their coacting interengagement define a plurality of expansible pumping compartments therebetween.

Two arcuate ports 269 and 270 extend through the port plate 261 in spaced relation to the crankshaft embracing bore 264. These ports connect the gear defined pumping chambers with the cover defined inlet and outlet chambers 259 and 260 and preferably diverge as shown toward the offset side of the pump chamber defining bore 266. The ports 260 and 270 may be divided into segments 269', 269" and 270', 270" thereby providing bridges supporting the port defining inner periphery of the plate member. Two pins 271 and 272 reference the plate 261 and thus the ports 269 and 270 with respect to the pump body member 262. To insure proper assembly, these pins are unequally spaced intermediate the adjacent bolt holes 263. In mounting the pump unit on the cover member, the pins 271 and 272 alternatively engage grooves or slots 273 and 274 which open on the pump mounting annular face 258 of the cover member 254. The grooves 273 and 274 insure proper alignment of the plate ports 269 and 270 with either the inlet or outlet chambers of the cover member. To provide pumping displacement between the pump inlet and outlet chambers with right hand or clockwise rotation of the engine crankshaft as viewed from the front of the engine, the pump unit is secured to the cover member 254 with the projecting ends of the pins 271 and 272 being loosely embraced by the grooves 273 and 274, respectively. To accommodate left hand or counterclockwise rotation of the crankshaft, the pump body and plate members are rotated through 180° and secured to the cover member 254 with the pin 272 engaging the groove 273 and the pin 271 engaging the groove 274. This locates the eccentricity of the gear mounting bore 266 above the crankshaft axis with the plate ports 270 and 269 in mating relation with the inlet and outlet chambers 259 and 260 thus providing pumping displacement between the inlet and outlet chambers with this hand of crankshaft rotation.

The inlet chamber 259 is connected through a passage 275 to an inlet 276 opening toward the crankcase chamber in the lower corner portion of the cover member 254. The port 276 sealingly embraces the forward end of an oil intake tube 277. The distal end of the tube 277 is connected to an oil intake screen assembly 277' located in the oil pan defined sump. The discharge chamber 260 is connected through a downwardly extending passage 278 to a gallery or manifold chamber 279 which extends transversely of the lower portion of the cover member. Two outlet ports 280 and 281 open from the laterally opposite ends of the manifold 279 to the block engaging face of the cover member and mate with the alternative elbow passages 187 formed in the adjacent crankcase side walls. As indicated above, one of the two block defined passages 187 is plugged thus effectively sealing the mating cover port 280 or 281. The pumped oil is thus supplied through the other outlet port and the adjacent block defined passage to the oil filter and cooler assembly 49—51 mounted on the adjacent side wall of the crankcase.

Two oil return ports 282 and 283 are provided in the cover member 254 immediately above the outlet ports 280 and 281. These oil return ports mate with alternative oil return elbow passages 188 formed in the adjacent crankcase side walls. One of the oil return passages is plugged to effectively seal the adjacent oil return port 282 or 283 of the cover member and the other return passage is connected to an oil return chamber defined by the adapter 49 of the oil filter cooler assembly. The alternate oil return ports 282 and 283 open to opposite legs 284 and 285 of a U-shaped distribution passage or gallery 286 extending upwardly and transversely of the upper portion of the cover member 254. The upper bight portion of this distribution passage is intersected by three outlet ports 287, 288 and 289. These ports open to the block engaging face of the cover member and mate with ports 189, 191 and 193 opening to the lower block end face 43. The ports 189 and 191 lead to oil distribution galleries 190 and 192 extending longitudinally of the crankcase defining deck 145 in flanking relation to the several cylinder supporting muffs 163. The intermediate port 289 is of small dimension relative to the ports 287 and 288 and mates with a block defined port 193. The port 193 is connected by a passage 194 extending through the adjacent bearing supporting web and rib 149 to supply oil to lubricate the front main bearing and crankshaft journal.

Referring to the lower right hand corner of FIGURE 12, the cover member wall defining the pump discharge manifold 279 is provided with a port 290. This port opens to a recess 291 in the cover member and opening to the engine crankcase chamber. The port 290 is controlled by a pressure relief valve 292. This valve is of a cup-shaped plunger type and is spring biased to regulate the oil pressure supplied to the filter and cooler assembly. A second cup-shaped plunger valve 293 is reciprocably mounted within the upper portion of the cover member. As seen in the upper right hand corner of FIGURE 12, this second valve controls a port 294 connecting a lateral bypass branch 295 off the U-shaped distribution passage 286 with the pump discharge chamber 260 through a passage 296 extending upwardly therefrom. The valve 293 is spring biased toward seating engagement with the port 294. This spring biasing is augmented by oil pressure from the gallery 286 which is supplied to the spring chamber behind the valve through a radial port 297. The valve 293 thus bypasses the oil filter and cooler assembly to insure adequate engine lubrication and cooling when the pressure differential between the pump discharge and the gallery exceeds a predetermined level. Such an excessive pressure differential may result from a restriction or blocking of oil flow through the oil filter and cooler assembly, or due to cool oil and lack of gallery pressure under engine starting conditions.

*Description of Engine Lubrication System Description of FIGURES 14–17*

Figure 16:
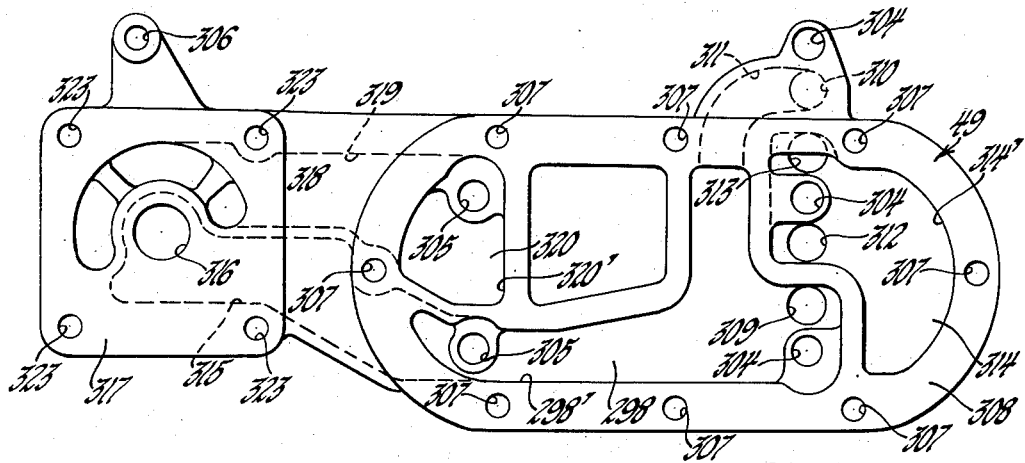
FIGURE 16 is an elevational view showing the details of a member adapted to mount an oil filter and an oil cooler unit on the side face of the engine block.
Figure 17:
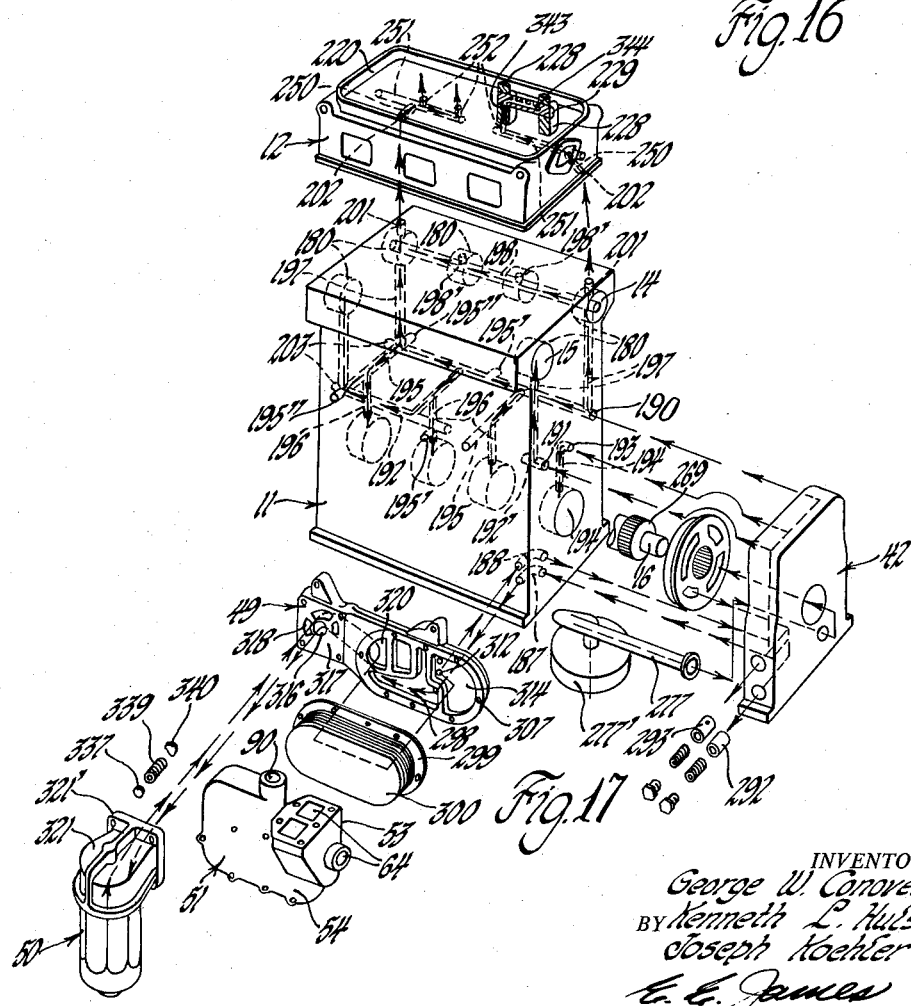
FIGURE 17 is a diagrammatic view showing the several engine and oil system accessory components in exploded perspective assembly and schematically illustrates the engine lubrication system provided by the invention.

The lubrication system for a three-cylinder engine is diagrammatically shown in FIGURE 17 and is illustrative of the series of inline engines of the invention. As indicated above, the pressurized oil normally passes from the pump 42 through one of the block defined elbow passages 187 to a chamber 298 which is formed between a recess 298' in the adapter plate 49 and a mating plate 299 mounting the core 300 of the oil cooler unit. Referring now to FIGURE 16 and briefly to FIGURES 2 and 3, the adapter 49 engages several bosses 301, 302 and 303 on the crankcase side wall of the block and is secured thereto by a plurality of bolts. These bolts extend through holes 304, 305 and 306 in the adapter and threadably engage tapped holes 301', 302' and 303' extending through the adapter engaging bosses in the adjacent block side wall. The oil cooler housing 54 and the core mounting plate 299 are secured to the adapter by a plurality of bolts which extend therethrough and engage tapped holes 307 provided in a mounting flange or boss 308 on the adapter plate 49. The adapter has a first inlet port 309 opening directly to the inlet chamber 298 and a second alternative inlet port 310 which is connected to the inlet chamber through a passage 311. Two alternative oil return ports 312 and 313 open to a return chamber 314 defined between the plate 299 and a second recess 314' in the adapter.

This alternative inlet and outlet port arrangement permits the same adapter plate to be used on either side wall of the engine. When the adapter plate shown in FIGURE 20 is used on the left crankcase side wall as shown in FIGURE 21, the inlet and return ports 309 and 312 respectively mate with the oil supply and return elbow passages 187 and 188. The alternative inlet and return ports 310 and 313 are sealingly closed by adapter engagement with the boss 301 on the left crankcase side wall of the block. In using the same adapter plate on the right hand crankcase side wall, the alternative inlet and outlet ports 310 and 313 mate with the elbow passages 187 and 188 in the adjacent side wall with the ports 309 and 312 being closed by the right side wall boss 301. The adapter configuration and bolt hole pattern provides a somewhat higher mounting of the oil cooler and water pump unit on the right hand side of the engine. To provide further versatility in the mounting of the oil cooler and water pump unit, an alternative adapter may be provided having a reverse image to that shown in FIGURES 16 and 17. Such an alternative adapter is illustrated in FIGURES 1 and 2. The oil supplied to the adapter inlet chamber 298 passes longitudinally through a passage 315 to a port 316 which opens centrally of a filter mounting face 317 provided on the adapter in spaced relation to the cooler mounting flange 308. An arcuate second port 318 opens on the filter mounting face in concentric spaced relation to the port 316. The port 318 is connected through a passage 319 to an oil cooler inlet chamber 320 which is partially defined by a recess 320' in the adapter plate.

Figure 15:
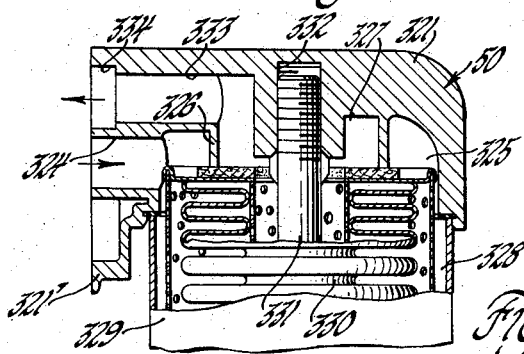
FIGURE 15 is a sectional view of the oil filter unit and is taken substantially in the direction of the arrows and in the plane of the line indicated at 15—15 in FIGURE 14.

A mounting flange 321' of a filter supporting base 321 is sealingly secured to the adapter mounting face 317 by four bolts. These bolts extend through equiangularly spaced bolt holes 322 and threadably engage tapped holes 323 provided in the filter mounting portion of the adapter member. An oil inlet port 324 opens centrally of the mounting flange 321' and mates with the adapter port 316. As best seen in FIGURE 15, the port 324 communicates inwardly of the filter base with an annular recess 325 partially defined by a partition wall 326. This partition wall further defines a central outlet chamber or recess 327. The oil inlet recess 325 is in open communication with a cylindrical chamber 328 formed between a housing can 329 and a cylindrical filter cartridge 330. The filter cartridge is of a conventional design having a corrugated filter paper element extending intermediate two concentrically spaced perforated sleeves. The housing can and filter unit are sealingly secured to the mounting base 321 by a bolt 331 extending therethrough. This bolt threadably engages a tapped hole 332 located centrally of the inlet and outlet recesses 325 and 327 in the mounting base.

The central outlet chamber 327 is in open communication with the interior sleeve of the filter unit and is connected through a passage 333 to an outlet port defined by a recess 334 formed in the base mounting flange 321'. The outlet port defining recess 334 subtends an angle of approximately 270° about the central inlet port 324. This permits the filter base to be rotated in its mounting on the adapter to orient the filter housing can and cartridge to extend vertically upwardly or downwardly or horizontally toward the rear of the engine. By use of an appropriate spacer member, the filter unit may also be located outwardly of the oil cooler unit, extending forwardly from its mounting location. In each of these filter mounting positions, the outlet port recess 334 of the filter base is connected to the arcuate port 318 of the adapter plate.

A groove 335 opening to the mounting flange defined recess 334 extends arcuately from the outlet passage 333 in spaced concentric relation to the oil inlet port 324. This groove serves to mount a filter bypass valve at its end opposite the passage 333. This bypass valve comprises a valve plate 337 which controls a port 338 opening to the oil filter inlet recess 325. The valve plate is thus subjected to the differential in oil pressures in the filter inlet and outlet chambers. A spring 339 is compressively interposed between the valve plate and a fixed spring seat plate 340 and biases the valve plate against the oil inlet pressure applied thereto. The plate 340 is retained within the valve mounting groove 335 by a single screw at 341 and by three equiangularly spaced bosses 342 which define plate seating shoulders. The filter bypass valve thus serves to interconnect the filter inlet and outlet chambers when the differential oil pressures therebetween exceeds a predetermined amount, e.g., 10–15 p.s.i.

The oil returning from the filter unit passes through the water cooled core 300 between the adapter defined inlet and outlet chambers 320 and 314 and then through the adjacent block defined oil return passage 188 to the U-shaped distribution gallery 286 of the crankcase cover member 254. The oil then passes to the longitudinally extending distribution galleries 190 and 192 of the block with a minor portion being supplied to the front main bearing and crankshaft journal through the passage 194. Lubrication for the remaining bearings and crankshaft journals are supplied through branch passages 195 extending transversely of the block deck 145. These transverse branch passages intersect the main galleries 190 and 192 and are in turn intersected by branch passages 196 which extend downwardly through the ribs 149 of the bearing supporting webs to the several main bearings. Ports 195' and 195" open on the opposite blower mounting faces 112 of the block and intersect the adjacent main oil galleries. These ports mate with oil passages 204 provided in opposite ends of the blower housing 116 and supply oil therethrough to the impeller journals and drive connections. At the rear of the block, two ports 203 intersect the adjacent transverse passage 195. These ports serve in the alternative to supply lubrication to the stub shaft journaling the idler gear 28.

*Alternate Cam and Balance Shaft Journalling Gallery Lubrication, Venting and Drainage Description of FIGURES 1–7 and 17–20*

Adjacent the front and rear of the block, the two main oil galleries 190 and 192 of the block are intersected by branch passages 197. These branch passages extend vertically upwardly and open on the bearing supporting bores 181 adjacent the ends of each shaft mounting gallery. The several bearing sleeves 180 each have a first radial port 180a mateable with the opening of the adjacent branch oil passage 197 when mounted in one of the end bearing supporting bosses. As best seen in FIGURES 2, 2a and 18–20 the journal portions 178 and 179 of the cam and balance shafts 14 and 15, respectively, each have an annular groove 199 opening circumferentially thereof. These grooves in the end journals of the cam and balance shafts communicate through the port 180a of its supporting bearing to the adjacent passage 197 for oil supply to the mating bearing surfaces. The journal portions of the camshaft 14 each have a radial port 199' interconnecting the circumferential groove therein with an oil distribution gallery 199 extending longitudinally therethrough. This oil distribution gallery is closed at each end and supplied with pressurized oil through the journal grooves 199 and the mating ports in the front and rear camshaft bearings and end journal portions of the camshaft and thus supplies oil to the several intermediate camshaft journals and bearings.

Referring briefly to FIGURES 1, 5–7 and 18–20, the several cam and balance shaft supporting bores 181 each have a longitudinally extending notch or groove opening thereon at 200. In the camshaft mounting gallery, these notches cooperate with the adjacent bearing sleeves to define orifices which communicate with the oil supply groove of their respective journal bearing through a second radial port 180b in each bearing sleeve. The several notch defined orifices thus serve to supply oil onto the adjacent cam lobes and tappets within the several compartments of the camshaft mounting gallery. The outer ends of the notches in the end bosses of the camshaft mounting gallery are preferably sealed by the upper front end plate 19 as shown in FIGURES 2 and 2a, respectively. By reversing the bearing sleeves end-for-end, similar alternate mounting and lubrication of the camshaft may be provided in the left-hand shaft mounting gallery, looking rearwardly of the block as seen in FIGURES 1, 5, 18 and 19, thereby accommodating end-for-end reversal of the cylinder head to provide alternate engine configurations in accordance with the invention.

As best shown in FIGURES 2, 2a, 4, 6 and 17–20, the passages 197 terminate upwardly in the ports 201 opening to the head mounting face of the block. In the camshaft mounting gallery, these upper ports are connected to the lower portions of the passages 197 through the oil supply grooves 199 and ports 180a and 180b of the front and rear bearing sleeves 180. In the balance shaft mounting gallery, the angular spacing of the ports 180a and 180b and the orientation of the bearing sleeves are such that the sleeves block or seal the ports 201 and the adjacent grooves 200; the bearing ports 180b being closed by the sleeve mounting bores 181.

Depending upon the orientation of the head in its mounting on the block, the ports 201 on the camshaft mounting side of the block mate with ports 202 in the block mating face of the head. These latter ports are connected through upwardly and obliquely inclined passages 250 to two branch distribution passages 251 which extend longitudinally of the head through the partition wall 210. The distribution passages 251 are intersected by ports 252. The several ports 252 are drilled centrally of certain of the tapped holes 253 which are provided in bosses 214, 216 and 218 to receive the bolts mounting the rocker shaft brackets 228. The several mounting bolts mating with the ports 252 and their brackets define restricted passages indicated at 343 in FIGURE 17. The several passages 343 each extend upwardly to a passage 344 extending axially of each bracket mounted rocker pivot shaft 229. Each of the several passages 344 is intersected by spaced radial ports thus lubricating the several rocker arms pivotally mounted on its respective shafts.

As previously indicated, the oil thus supplied to the overhead valve and injector actuating mechanisms drains from the head rocker compartment through the head defined drain ports 236, 237, 238, 212', and 212" into the adjacent camshaft mounting gallery 168. This drainage from the overhead compartment is augmented in the camshaft mounting gallery by the oil supplied to the bearings 180 and by the oil emitted from the several notch-defined orifices 200. Passing longitudinally through the outboard ports 183, the oil drains from the galleries 168 to the engine crankcase compartment 46 through the timing gear chamber 21, the front cover defined compartment 35, and through the block defined passages 186. Upon engine shutdown, the several ports 183 entrap a limited level of oil in the gallery compartments intermediate the drain passages 186 and/or the end ports 183' and 183". During engine starting, rotation of the cam lobes through this entrapped oil insures adequate lubrication of the several lobes and their associated valve actuating followers until the oil pressure in the gallery 198 is sufficient to spray oil thereon from the several orifices 200.

The several oil drain ports and passageways are so located and of a size to insure adequate oil drainage and breathing between the rocker compartment, the shaft galleries and the crankcase chamber under all engine operative conditions. The oil returning to the crankcase through the block defined passages 186 flows downwardly in a relatively thin film over the passage defining surfaces. Such drainage thus provides a central column of air extending between the gallery and the crankcase chamber and results in deaeration of the draining oil. Similar deaeration occurs from the oil returning through the timing gear chamber 21 and the front cover compartment 35.

In accordance with usual engine practice, the crankcase chamber 46 is vented to the atmosphere outside the engine to accommodate reciprocation of the several pistons and to prevent the build up of explosive crankcase pressures. In the illustrative engine embodiment, this crankcase venting is accomplished through an oil separator and crankcase breather unit 345 as shown in FIGURE 2a. This unit is mounted on the timing gear housing 20 and closes an access opening provided therein for one of the accessory drive gears 25. In addition to its oil separating and crankcase venting functions, the unit 345 has an oil filler connection at 347.

*Summary*

From the foregoing description of the several illustrative inline engines and their accessory components, it will be seen that the various objectives and advantages of the invention have been achieved; that the resultant engine structures provide a plurality of different engine models and alternative accessory mounting locations; and that the improved cylinder block and cylinder head constructions provide two-cycle engines of relatively high power density, provide improved cooling systems for such engines, provide improved lubrication and breathing, and provide improved overall engine efficiency.

It will be apparent to those skilled in the art, that various modifications might be made from the several illustrative embodiments of the invention without departing from the spirit and scope of the invention as defined in the following claims.

We claim:

1. In an internal combustion engine, a frame member defining a plurality of inline cylinders and having two parallel shaft mounting galleries extending therethrough in symmetrical flanking relation to a plane common to and including the axes of the several cylinders, a plurality of bearing supporting bosses spaced longitudinally of said galleries between the several cylinders and adjacent each end of the frame member, said bosses having aligned grooves extending longitudinally thereof and opening inwardly of their bearing supporting surfaces, said longitudinal grooves being disposed symmetrically with respect to said common plane, a camshaft member alternatively mountable in one of said galleries and having cam lobes thereon intermediate barrel-type journal portions spaced radially of the bosses of said one gallery, a balance shaft member alternatively mountable in the other of said galleries and having journal portions spaced radially of the end bosses of said other gallery, interchangeable bearing sleeves rotatably mounting said shaft journal portions within their respective supporting bosses, lubricant supply means including passages in said frame member connecting said supply means to ports opening on the bearing supporting surfaces of the bosses adjacent at least one end of each gallery in angularly spaced relation to the longitudinal groove thereof, said bearing sleeves being reversible end for end and each having a first radial port therein mateable with the supply port of the end adjacent bosses and a second radial port mateable with the longitudinal grooves of the mounting bosses within the camshaft mounting gallery, said second radial ports being closed by the bearing supporting surfaces of the end bosses of the balance shaft mounting gallery, said camshaft having a central oil distribution gallery extending longitudinally therethrough, and each of said camshaft journal portions having a radial port intersecting said central gallery and a circumferential groove therein mating with the radial ports of the adjacent sleeve bearing whereby lubricant is continuously metered and squirted onto the adjacent cam lobes through orifices defined between the several longitudinally extending grooves and the mating bearing sleeves.

2. In an internal combustion engine, a frame member defining a crankcase chamber, a plurality of inline cylinders, and two parallel shaft mounting galleries extending therethrough in symmetrical flanking relation to a plane common to and including the axes of the several cylinders, a plurality of bearing supporting bosses spaced longitudinally of said galleries between the several cylinders and adjacent each end of the frame member, said bosses having aligned grooves extending longitudinally thereof and opening inwardly of their bearing supporting surfaces, said longitudinal grooves being disposed symmetrically with respect to said common plane, lubricant supply means including passages in said frame member connecting said supply means to ports opening on the bearing supporting surfaces of the bosses adjacent one end of each gallery in angularly spaced relation to the longitudinal groove thereof, a camshaft member alternatively mountable in one of said galleries and having cam lobes thereon intermediate barrel-type journal portions spaced radially of the bosses of said one gallery, a balance shaft member alternatively mountable in the other of said galleries and having journal portions spaced radially of the end bosses of said other gallery, interchangeable bearing sleeves rotatably mounting said shaft journal portions within their respective supporting bosses, the several camshaft journal portions and their supporting bearings and bosses dividing said camshaft gallery into a plurality of lubricant receiving compartments, said bearing sleeves being reversible end for end and each having a first radial port therein mateable with the supply port of the end adjacent bosses and a second radial port mateable with the longitudinal grooves of the mounting bosses within the camshaft mounting gallery, said second radial ports being closed by the bearing supporting surfaces of the end bosses of the balance shaft mounting gallery, said camshaft having a central oil distribution gallery extending longitudinally therethrough and each of said camshaft journal portions having a radial port intersecting said central gallery and a circumferential groove therein mating with the radial ports of the adjacent sleeve bearing whereby lubricant is continuously metered and squirted onto the adjacent cam lobes through orifices defined between the several longitudinally extending grooves and the mating bearing sleeves, said frame member further defining passages connecting said crankcase chamber to said shaft mounting galleries adjacent the lubricant supply port ends thereof and having a plurality of aligned ports formed outwardly of the several bearing supporting bosses, said aligned ports and passages being of a size to vent and drain the several camshaft gallery compartments longitudinally of the frame member and through said passages to said crankcase chamber.

3. In an internal combustion engine, a frame member defining a crankcase chamber, a plurality of inline cylinders, and a camshaft gallery extending longitudinally therethrough in spaced relation to the several inline cylinders, a plurality of bearing supporting bosses spaced longitudinally of the camshaft gallery intermediate the several cylinders and adjacent each end of the frame, each of said bosses having a groove extending longitudinally thereof and opening inwardly on its bearing supporting surface, lubricant supply means including passages in said frame member connecting said supply means to ports opening on the bearing supporting surfaces of the bosses adjacent the ends of said frame member, a camshaft mountable in said gallery and having spaced barrel-type journal portions and cam lobes thereon intermediate said journal portions, interchangeable sleeve bearings mounted in each of the several annular bosses and rotatably embracing the adjacent journal portions of the camshaft, the several camshaft journal portions and their supporting bearings and bosses dividing said camshaft gallery into a plurality of lubricant receiving compartments, each of said sleeve bearings having a first radial port therein connectable with the lubricant supply ports of said end bosses and a second radial port mating with the longitudinally extending groove of its respective mounting boss, and said camshaft having a central oil distribution gallery extending longitudinally therethrough and each of said journal portions having a circumferential groove connected to said central gallery by a radial port whereby the supplied lubricant is continuously squirted onto the adjacent cam lobes from the orifices defined between the longitudinally extending grooves and the mating sleeve bearings.

4. In an internal combustion engine as set forth in claim 3, said frame member further defining a passage connecting said crankcase chamber to said camshaft gallery between two of said bearing supporting bosses and having a plurality of aligned ports formed outwardly of the several bearing supporting bosses, said aligned ports and passage being of a size to continuously vent and drain the supplied lubricant longitudinally from the several camshaft gallery compartments and through said passage to said crankcase chamber.

5. In an internal combustion engine having a plurality of inline cylinders, a frame member having a camshaft gallery extending therethrough with a plurality of annular bearing supporting bosses spaced longitudinally thereof intermediate each cylinder and adjacent each end of the frame member, each of said bosses having a groove extending longitudinally thereof and opening inwardly of its bearing supporting surface, lubricant supply means including passages in said frame member connecting said supply means to ports opening on the bearing supporting surfaces of certain of said bosses, a camshaft mountable in said gallery and having barrel-type journal portions thereon in spaced radial relation to said annular bosses, interchangeable sleeve bearings mounted in each of the annular bosses and rotatably embracing the adjacent journal portions of said camshaft, said sleeve bearings each having a first radial port therein connectable with the port of its mounting boss and a second radial port mating with the longitudinal groove of its respective mounting boss, said camshaft having a central oil distribution gallery extending longitudinally therethrough and each of said camshaft journal portions having a radial port intersecting said central gallery and opening outwardly on a circumferential groove mating with the radial ports of the adjacent sleeve bearing whereby lubricant is continually metered to the several longitudinal extending grooves and squirted from the orifices defined between the several longitudinally extending grooves and the mating bearing sleeves.

6. In an internal combustion engine, a frame member defining a plurality of inline cylinders and having a camshaft gallery extending therethrough in spaced relation to the several cylinders, a plurality of bearing supporting bosses spaced longitudinally of said camshaft gallery intermediate each cylinder and adjacent each end of the frame member, each of said bosses having a groove extending longitudinally thereof and opening inwardly of its bearing supporting surface, a camshaft member mountable in said gallery and having cam lobes thereon intermediate barrel-type journal portions spaced radially of said bosses, interchangeable bearing sleeves rotatably mounting the camshaft journal portions within the several bosses, each of said bearing sleeves having a radial port mating with the longitudinal groove of its respective mounting boss, each of said camshaft journal portions having a circumferential groove mating with the radial port of the adjacent bearing sleeve, and lubricant supply means including passages in at least one of said members connecting said supply means to ports opening to said circumferential grooves whereby lubricant is continuously metered and squirted onto the adjacent cam lobes through orifices defined between the several longitudinally extending grooves and the mating bearing sleeves.

7. In an internal combustion engine, a cylinder block structure defining a crankcase chamber, a plurality of inline cylinders, and a camshaft gallery extending longitudinally therethrough in spaced relation to the several inline cylinders, said block having a plurality of bearing supporting bosses spaced longitudinally of said camshaft mounting gallery between the several cylinders and adjacent each end thereof, said bosses dividing said camshaft gallery into a plurality of lubricant receiving compartments, said cylinder block further defining drain passages connecting said camshaft gallery to said crankcase chamber and having a pluarlity of longitudinally aligned drain ports extending through the several bearing supporting bosses and interconnecting the several lubricant receiving compartments of camshaft gallery, said drain ports being located slightly above the bearing supporting surfaces of the adjacent bosses and of a size to longitudinally drain and vent the several camshaft gallery compartments above a cam lobe immersing lubricant level and through said drain passages to said crankcase chamber, said bosses having aligned grooves extending longitudinally thereof and opening inwardly of the upper portion of their bearing supporting surfaces, lubricant supply means including passages in said cylinder block connecting said supply means to a port opening on the bearing supporting surface of the boss adjacent one end of the camshaft gallery and in angularly spaced relation to the longitudinal groove thereof, a camshaft member mountable in said gallery and having cam lobes thereon intermediate barrel-type journal portions concentrically embraced by the bosses of said camshaft gallery interchangeable bearing sleeves rotatably mounting said shaft journal portions within their respective bosses, said bearing sleeves each having a first radial port therein mateable with the supply port of the end adjacent bosses and a second radial port mateable with the longitudinal grooves of the mounting bosses within the camshaft gallery, and said camshaft having a central oil distribution gallery extending longitudinally therethrough and each of its journal portions having a radial port therein intersecting the central gallery and a circumferential groove therein mating with the radial ports of the adjacent sleeve bearing whereby lubricant is continuously metered and sprayed longitudinally onto the adjacent cam lobes through orifices defined between the several longitudinally extending grooves and the mating bearing sleeves.

References Cited in the file of this patent

UNITED STATES PATENTS

| 2,179,709 | Brecht | Nov. 14, 1939 |
| 2,619,189 | Witzky et al. | Nov. 25, 1952 |
| 2,725,955 | Roos | Dec. 6, 1955 |
| 2,728,333 | Albinson | Dec. 27, 1955 |
| 2,729,204 | Meyer | Jan. 3, 1956 |